Oct. 29, 1957  A. V. OSBORNE ET AL  2,811,339
SEPARABLE GLASS COATED AGITATORS
Filed Dec. 2, 1955  2 Sheets-Sheet 1
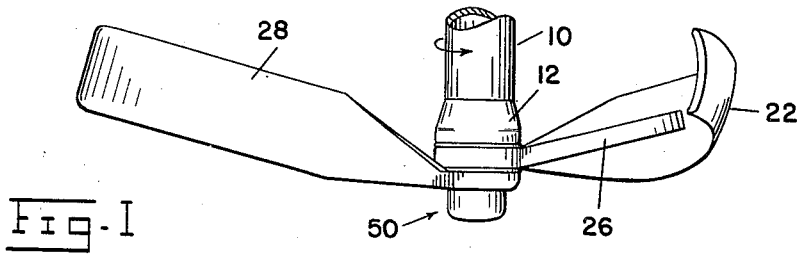
Fig. 1
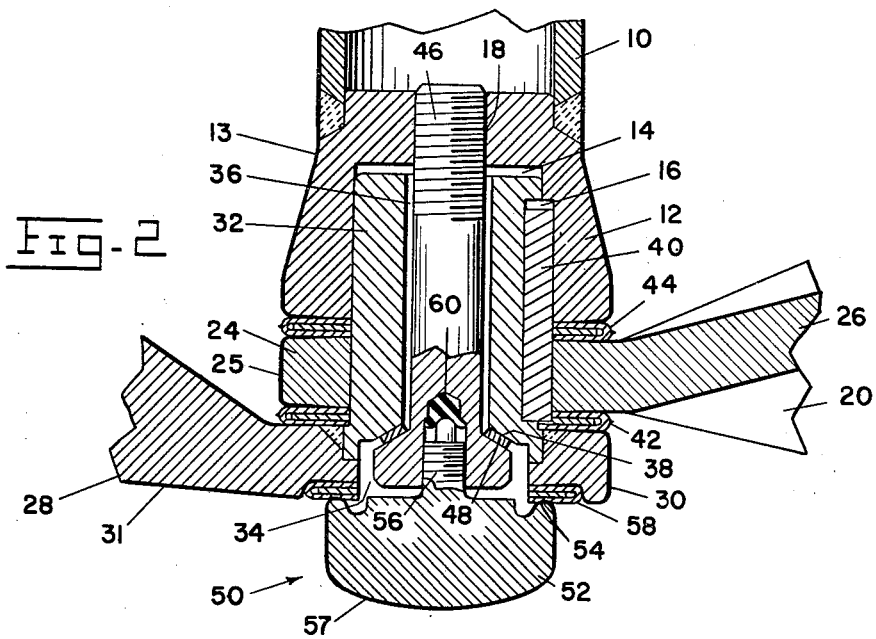
Fig. 2
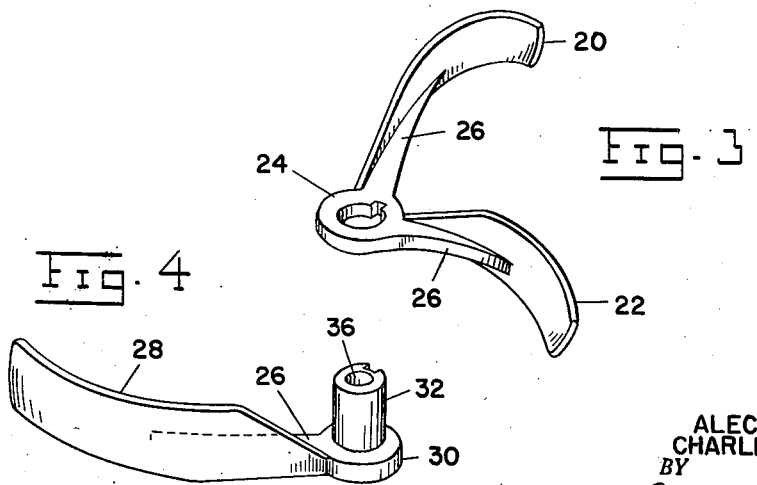
Fig. 3
Fig. 4
INVENTORS
ALEC V. OSBORNE
CHARLES W. WEBSTER
BY
Edward H. Cumpston
THEIR ATTORNEY.

Oct. 29, 1957   A. V. OSBORNE ET AL   2,811,339
SEPARABLE GLASS COATED AGITATORS
Filed Dec. 2, 1955                                2 Sheets-Sheet 2

INVENTORS
ALEC V. OSBORNE
CHARLES W. WEBSTER
BY
THEIR ATTORNEY

United States Patent Office 2,811,339
Patented Oct. 29, 1957

2,811,339

SEPARABLE GLASS COATED AGITATORS

Alec V. Osborne, Brighton, and Charles W. Webster, Greece, N. Y., assignors to The Pfaudler Co., Rochester, N. Y., a corporation of New York Application December 2, 1955, Serial No. 550,588

12 Claims. (Cl. 259—134)

This invention relates to glass coated agitators and more particularly to glass coated agitators comprising one or more sections which may be disassembled and reassembled in the field, one object being the provision of an improved agitator of this description having a more efficient and advantageous construction.

It has long been common practice in the processing of materials to provide large closed vessels for mixing the ingredients and to carry out reactions. These vessels are frequently equipped with mechanically driven agitating means which generally comprise a shaft carrying a number of transversely extending blades for agitating the mixture in the container. These agitators must occasionally be removed for repair or replacement, and thus, it is necessary that means be provided for removing and reinserting the same into the container. This is commonly done through a manhole in the side or in one end of the container.

Where the blades of such agitators are rigidly and permanently fastened to the shaft it is necessary to provide an enlarged opening in order to be able to insert the agitator and transversely extending blades. Where blades are removable as a unit from the shaft, a somewhat smaller opening may be used since the agitator may be inserted by placing one blade in the opening and working it around until the other blades pass therethrough. However, in the case of an agitator having three or more blades rigidly fastened to a hub, the hole must be larger than the radius of the agitator in order to make it possible to insert the same. Since the manhole openings in tanks are relatively expensive to construct, considerable savings can be realized by the provision of agitators that can be inserted through a small opening. For this reason, it is desirable to provide an agitator having removable or separable blades in order that the separate blades may be inserted and the agitator assembled inside the tank, and the provision of an improved and more efficient agitator of the above description having separable blades is another object of this invention.

Many industries involve the processing of corrosive materials and processing equipment is frequently protected with a thin layer of corrosion resisting material such as glass or vitreous enamel. In applications of this sort, it is frequently desirable to provide an agitator coated in like manner. However, when separable glass coated members are used, it is necessary to provide fastening means therebetween which are so designed that no metal is exposed to the contents of the container. For this reason, another object of this invention is the provision of separable glass coated agitators having internal fastening means for uniting the separate elements which are so designed that only the glass coating is exposed to the contents of the container.

A further object is the provision of an agitator of the above description having a simple, positive fastening means which may be readily and economically manufactured, and which is convenient, reliable and satisfactory in operation.

To these and other ends the invention resides in certain improvements and combinations of parts, all as will be hereinafter more fully described, the novel features being pointed out in the claims at the end of the specification.

In the drawings:

Fig. 1 is a fragmentary side elevational view of an agitator embodying this invention;

Fig. 2 is an enlarged elevational cross sectional view of the agitator of Fig. 1;

Fig. 3 is a perspective view of a double blade portion and hub removed for purposes of clarity;

Fig. 4 is a perspective view of a single blade portion and hub removed for purposes of clarity;

Figure 5:
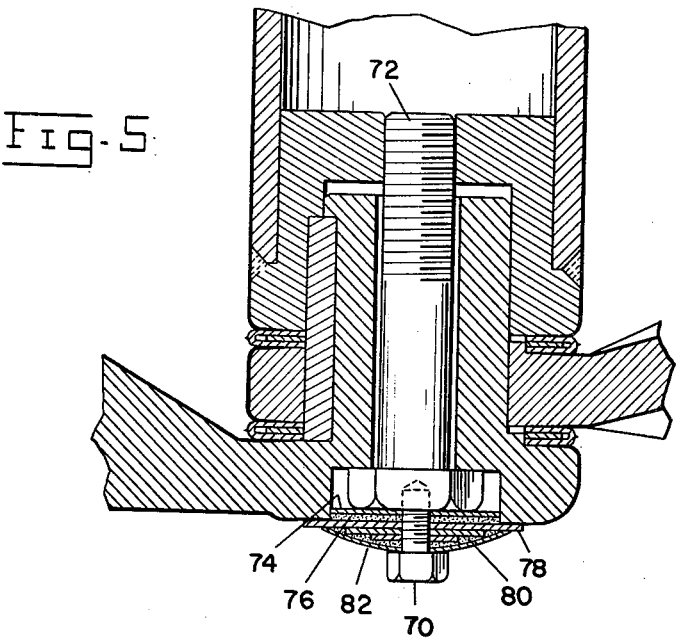
Fig. 5 is an enlarged cross sectional elevational view of a modified form of an agitator embodying this invention.

An agitator embodying this invention preferably comprises a hollow shaft part of generally tubular shape, terminating in an end section, a plurality of removable blades and fastening means for attaching the blades to the hub, as herein shown for purposes of illustration.

Referring to the drawings, the shaft comprises a tubular part 10 which is welded to a conical end section 12. The entire surface of this assembly is coated with a continuous layer of vitreous enamel, or glass 13, which extends partially over the lower surface of end section 12. End 12 is bored out to form a relatively large cylindrical recess 14 having a keyway 16 on the side thereof. A tapped hole 18 is bored in the center of the hub section and extends therethrough as shown in the figures.

In the three bladed embodiment, the blades are preferably provided in two portions or elements one of which comprises two integral blades and the other a separate single blade. The double blade portion, shown in Fig. 3, comprises two agitator blades 20 and 22 radiating out from a central hub 24. Blades 20 and 22 may be solid or hollow, as desired, and may be of any desired shape. The entire surface of the blades is protected by a coating of glass 25 which extends partially over the central hub portion 24. Ribs 26 may be provided to add strength and rigidity, if the application of the agitator so warrants.

The single blade portion, shown in Fig. 4, comprises a blade 28 attached to a hub 30. Blade 28 and hub 30 are also protected by a coating of glass 31. An upwardly extending hollow cylindrical boss 32 is welded or otherwise fixed at the center of hub 30. Hub 30 is bored to form a recess 34 (Fig. 2) at the bottom, communicating with the central bore 36 of boss 32. A conical bearing shoulder 38 is formed at the junction of bore 36 and recess 34.

The agitator is assembled by placing the double blade portion over boss 32, and inserting a key 40 which holds the three blades against relative rotation. A resilient gasket 42 of known and suitable corrosion resisting material is placed between the blade portions to provide a resilient cushion and a liquid-tight seal therebetween. The entire three bladed assembly described above is then attached to end section 12 by inserting boss 32 into bore 14 with the key 40 engaging keyway 16 to form a single, rigid unit. A second resilient and corrosion resisting gasket 44 is placed between hub 24 and the end of shaft 12 to cushion these parts and to provide a liquid-tight seal therebetween.

The entire blade assembly is then drawn together by a bolt 46 (Fig. 2) which passes inwardly through bore 36 to engage the threaded hole 18 in the shaft end 12 and which, when drawn tight, locks the three blades to the shaft to form an integral agitator assembly. A flat resilient spring washer 48 of known and suitable construction is interposed between a conical bearing surface on the head of bolt 46 and the conical shoulder 38 of boss 32. When the bolt is drawn tight, washer 48 is deformed, taking on a conical shape. The force exerted by the deformed resistant washer against shoulder 38 and bolt 46 frictionally locks these parts in place.

The head portion of bolt 46 is drilled and tapped to receive a cap indicated generally at 50. Cap 50 comprises a large smoothly rounded head portion 52 having a peripheral groove forming a projecting annular lip 54, and a small upstanding threaded stud portion 56 terminating in a smoothly rounded end. The entire surface of the head of cap 50 is covered with a coating of glass 57 which extends over the head thereof and around and over the annular lip 54 described above.

Cap 50 is inserted and screwed into the threaded hole in the head of bolt 46, and drawn up tightly until annular lip 54 engages a gasket 58 forming a liquid-tight seal between the cap and the hub portion 30 of the agitator. A small plug 60 of silicone rubber or other resilient material is placed in the base of the hole in bolt 46 for engagement by the round end cap 50, so as to be compressed and provide frictional resistance for holding the cap in its tightened position. Since the head of cap 50 is round, it may be tightened by means of a strap wrench or by other means which will grip a rounded surface but which will not mar the glass surface thereon. Cap 50 is drawn into place tightly enough to form a liquid tight seal between glass coated annular lip 54 and resilient gasket 58, but since the cap has no function other than sealing recess 34, it need not be drawn excessively tight, and thus there is no danger of marring the glass surface.

In use, the agitator blade portions are separately inserted into the container through the manhole. Since each of these blade portions has a dimension of relatively small size, they may be easily inserted through a relatively small manhole. After insertion in the container, they are assembled and bolted into place by bolt 46 which may be drawn up tightly by means of a socket wrench provided for the purpose. When this has been done, all component parts of the agitator are securely held in place, and cap 50 is then screwed into place and tightened with sufficient force to form a liquid-tight seal for opening 34. The agitator is then ready for operation. All vertical stresses are borne by heavy bolt 46 and rotational force is transmitted by key 40. Thus, bolt 46 and key 40 tie the entire assembly into a rigid unit. Excepting only the thin edges of gaskets 58, 42, and 44, only glass coated surfaces are exposed to the contents of the tank.

In certain cases, it is permissible to have small areas of a corrosion-resistant metal such as tantalum exposed to the contents of the tank. The embodiment shown in Fig. 5 may be used for such applications. This embodiment is similar to that disclosed above, except that glass coated cap 50 is replaced by a tantalum stud bolt 70 and a plurality of thin tantalum washers. Stud bolt 70 is threadedly fastened to a bolt 72, similar to bolt 46 described above. A tantalum washer 74 is then placed over the head of bolt 72, and covered with a layer of corrosion resistant cement 76. A series of washers 78 are then applied and covered with a second layer of cement 80. A dome shaped resilient washer 82 is then applied over the cement and drawn tightly into place by stud bolt 70 to form an impervious, corrosion resistant seal for protecting the internal fastening means, as in the first described embodiment.

Figure 6:
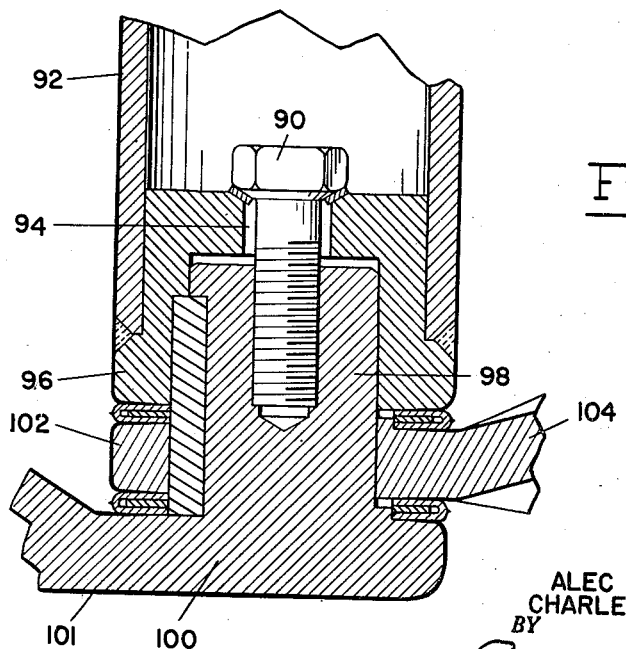
Fig. 6 is an enlarged cross sectional view of a second modified form of agitator embodying this invention.

Fig. 6 shows a second modified embodiment of the invention which is similar to the ones described above with the exception that the double blade assembly has no opening on the under surface thereof, but is solidly glassed over at this portion. This assembly is fastened together by a bolt 90 which is similar to bolt 46, described above, with the exception that the head thereof is not recessed. Bolt 90 extends through an opening 94 in the end section 96 which is welded or otherwise fixed to the shaft 92. These parts are protected by continuous glass coating 97 covering the entire outside surface of shaft 92 and extending downwardly and partially over the bottom surface of end section 96. End section 96 is recessed to receive a boss 98 similar to boss 32 on the hub of the lower or outer blade portion 100. Blade portion 100 is similarly protected by a continuous coating of glass 101 extending completely thereover and partially covering the hub thereof. Boss 98 is drilled with a bore and threaded to receive bolt 90.

The agitator is assembled by placing the hub 102 of a glass coated upper blade portion 104 over boss 98 and inserting boss 98 into the recessed end section 96. Bolt 90 is then placed in shaft 92 with its head bearing on the upper surface of end 96 and its shank extending through opening 94 to engage the threaded portion on boss 98. Bolt 90 is then tightened by means of an extension wrench, drawing the entire agitator blade assembly against end portion 96, forming a single rigid unit. The wrench is then removed and the agitator is ready for use. In this embodiment, the fastening means for the agitator are entirely internal to the shaft and hub and therefore no sealing means are required to prevent exposure thereof to the corrosive action of the material in the container. Only glass surfaces are exposed and the fastening means are completely protected.

Thus it can be seen that this invention accomplishes its stated objects. All components of the agitator may be inserted through a relatively small opening and may then be assembled in place inside the container. Once assembled, the fastening means are completely internal, and thus no part of the fastening means are exposed to the corrosive action of the material of the container. The fastening means are relatively simple in operation, and relatively inexpensive to manufacture.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A separable, corrosion resisting agitator means comprising a glass coated driving shaft terminating in a recessed end portion, a plurality of glass coated blade portions separable from said shaft and from one another, fastening means enclosed in said recessed end portion for securing said blade portions together and to said shaft, and means for sealing said recessed portion against access thereto of fluids to be agitated.

2. A separable, corrosion resisting agitator means comprising a glass coated, driving shaft terminating in a recessed end portion, a plurality of glass coated blade portions separable from said shaft and from one another and extending radially from said shaft in substantially the same plane, fastening means located in said recessed end portion for securing said blade portions together and to said shaft, and means for sealing said recessed portion against access thereto of fluids to be agitated.

3. A separable corrosion resisting agitator means comprising a glass coated, driving shaft terminating in a recessed end portion, a plurality of glass coated blade portions separable from said shaft and from one another and having hub portions formed with openings, fastening means secured to said shaft and one of said hub portions for securing said blade portions together and to said shaft, said fastening means being located in said recessed portion and said hub openings and means for sealing said recessed portion against access thereto of fluids to be agitated.

4. A separable, corrosion resisting agitator means comprising a glass coated, driving shaft terminating in a recessed end portion, a plurality of glass coated blade portions, separable from said shaft and from one another and having hub portions formed with openings, threaded fastening means secured to said shaft and one of said hub portions, for securing said hub portions together and to said shaft, said threaded fastening means being enclosed in said recessed end portion and said hub openings, and gasket means between said hub portions and shaft and sealing said fastening means against access thereto of fluid to be agitated, and means for securing said end portion and said blades against relative rotation.

5. A separable, corrosion-resisting agitator means comprising a glass coated, driving shaft having an end formed with a recess, a plurality of glass coated blade portions separable from one another and from said shaft, one of said blade portions having its hub formed with a boss fitting in said shaft recess, the other of said blade portions having a hub portion formed with an opening fitting over said boss of the first mentioned blade portion, and fastening means securing said boss to said shaft, said fastening means being located in said shaft recess and boss and sealed therein against access thereto of fluid to be agitated.

6. A separable, corrosion resisting agitator means comprising a glass coated, driving shaft terminating in a recessed end portion, a plurality of glass coated blade portions separable from said shaft and from one another, one of said blade portions being formed at one side with a hollow boss extending through an opening in the other of said blade portions and into said recessed portion, the first mentioned blade portion having at its opposite side a recess aligned with said boss, threaded fastening means located in the recess in said blade portion and extending through said hollow boss and threadedly engaging said end portion, and means for sealing the recess in said blade portion.

7. A separable, corrosion resisting agitator means comprising a glass coated, driving shaft terminating in a recessed end portion, a plurality of glass coated blade portions separable from said shaft and from one another, one of said blade portions being formed with a recess on the outer side thereof and with a hollow boss portion extending through an opening in the other blade portion and fitting in the recess in said end portion, threaded fastening means enclosed in the recess in said blade portion and in said boss portion and threadedly engaging said end portion to secure said blade portions together and to said shaft, and sealing means threadedly engaging said fastening means for sealing said recess in said blade portion.

8. A separable, corrosion resisting agitator means comprising a glass coated, driving shaft terminating in a recessed end portion, a plurality of glass coated blade portions separable from said shaft and from one another, one of said blade portions being formed with a recess on the outer side thereof and with an inwardly extending hollow boss portion fitting in the recess in said end portion, the other of said blade portions being formed with a hub portion formed with an opening fitting over said boss portion, threaded fastening means located in the recess in said blade portion and extending through said boss portion and threadedly engaging said end portion, key means for securing said end portion and said blade portions against relative rotation, and glass coated cap means threadedly engaging said fastening means for sealing said recess in said blade portion.

9. A separable, corrosion resisting agitator means comprising a glass coated, driving shaft terminating in a recessed end portion, a plurality of glass coated blade portions, one of said blade portions being formed with a recess on the outer side thereof and an inwardly extending hollow boss portion fitting in the recess in said end portion, the other blade being formed with a hub portion formed with an opening fitting over said boss portion, threaded fastening means located and sealed in the recess in said blade portion and extending through said boss portion and threadedly engaging said end portion, key means for securing said end portion and said blade portions against relative rotation, and corrosion resistant bolt and washer means threadedly engaging said fastening means for sealing said recess in said blade portion.

10. A separable, corrosion resisting agitator means comprising a glass coated, driving shaft terminating in a recessed end portion, a plurality of glass coated blade portions separable from said shaft and from one another, one of said blade portions being formed with boss means extending through an opening in the other of said blade portions and into the recessed portion of said shaft, threaded fastening means enclosed in said shaft and said recessed end portion and engaging said boss for securing said blades together and to said shaft, and means for sealing said recessed portion against access thereto of fluids to be agitated.

11. A separable, corrosion resisting agitator means comprising a glass coated, driving shaft terminating in a recessed end portion, a plurality of glass coated blade portions separable from said shaft and from one another, one of said blade portions being formed with boss means extending through an opening in the other of said blade portions and into the recessed portion of said shaft, said boss means having its inner end formed with a threaded bore, threaded fastening means fixed in said recessed end portion and engaging said threaded bore of said boss portions for securing said blades together and to said shaft, means engaged between said recessed shaft portion and said blade portions for preventing relative rotation of said shaft and blade portions and means for sealing said rotation preventing means against access thereto of fluid to be agitated.

12. A separable, corrosion resisting agitator means comprising a glass coated, driving shaft terminating in a recessed end portion, a plurality of glass coated blade portions separable from said shaft and from one another, one of said blade portions being formed with an inwardly extending boss portion fitting in said recessed shaft portion, the other blade portion being formed with a hub portion containing an opening fitting over said boss portion, fastening means within said shaft and recessed end portion and threadedly engaging said boss portion for fastening said blade portions together and to said shaft, and gasket means between said blade portions and recessed shaft portion for sealing said fastening means against access thereto of fluid to be agitated.

References Cited in the file of this patent

UNITED STATES PATENTS

| | | |
|---|---|---|
| 1,074,397 | Westby | Sept. 30, 1913 |
| 1,270,583 | Zinno | June 25, 1918 |
| 1,519,533 | Dengle | Dec. 16, 1924 |